United States Patent
Tanaka et al.

(10) Patent No.: US 11,330,137 B2
(45) Date of Patent: May 10, 2022

(54) IMAGE FORMING APPARATUS

(71) Applicant: CANON KABUSHIKI KAISHA, Tokyo (JP)

(72) Inventors: Takatoshi Tanaka, Atami (JP); Rikuo Kawakami, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/879,467

(22) Filed: May 20, 2020

(65) Prior Publication Data
US 2020/0374416 A1 Nov. 26, 2020

(30) Foreign Application Priority Data
May 24, 2019 (JP) .............................. JP2019-098112

(51) Int. Cl.
*H04N 1/047* (2006.01)
*G02B 26/12* (2006.01)

(52) U.S. Cl.
CPC ........... *H04N 1/047* (2013.01); *G02B 26/127* (2013.01)

(58) Field of Classification Search
CPC ...... E21B 43/128; E21B 47/12; F04D 13/086; F04D 13/10; F04D 29/086; F04D 29/406; F04D 29/426; F04D 29/528; F04D 29/628; F04D 29/648; F04D 29/708; F16L 37/138; F16L 37/14; F16L 37/22; G02B 26/127; H04N 1/047
USPC ........................................................ 358/474
See application file for complete search history.

(56) References Cited

U.S. PATENT DOCUMENTS

| | | | | |
|---|---|---|---|---|
| 5,999,345 A * | 12/1999 | Nakajima | ............... | G02B 27/09 |
| | | | | 250/234 |
| 7,145,705 B2 * | 12/2006 | Hayashi | .................. | B41J 2/473 |
| | | | | 359/204.1 |
| 2007/0047048 A1 * | 3/2007 | Shimizu | ............... | G06K 15/129 |
| | | | | 359/216.1 |
| 2007/0206259 A1 * | 9/2007 | Nakajima | ............ | G02B 26/105 |
| | | | | 359/199.1 |
| 2007/0242332 A1 * | 10/2007 | Fujimori | ................ | G03G 15/50 |
| | | | | 359/204.1 |

(Continued)

FOREIGN PATENT DOCUMENTS

| JP | H09-211744 A | 8/1997 |
|---|---|---|
| JP | 2003-127456 A | 5/2003 |

(Continued)

*Primary Examiner* — Negussie Worku
(74) *Attorney, Agent, or Firm* — Canon U.S.A., Inc. I.P. Division (57) ABSTRACT

An image forming apparatus including a first output unit configured to detect a light beam deflected by a rotary polygon mirror rotated by a drive unit to output a first signal, a second output unit configured to output a second signal to be used as a reference, and a first controller configured to perform the phase control based on the first signal and the second signal. The phase control is performed in accordance with a condition set based on a rotation speed of the drive unit corresponding to an image forming speed by outputting a drive signal having a predetermined pulse width to the drive unit to accelerate or decelerate the drive unit so that the first signal and a position signal, based on the second signal, substantially match. The condition being a pulse width of the drive signal and/or a frequency of performing the phase control.

12 Claims, 9 Drawing Sheets

(56) References Cited

U.S. PATENT DOCUMENTS

| | | | | |
|---|---|---|---|---|
| 2008/0291516 A1* | 11/2008 | Gomi | ............... | G02B 26/105 |
| | | | | 359/213.1 |
| 2009/0252537 A1* | 10/2009 | Choi | ............... | G02B 5/09 |
| | | | | 399/221 |
| 2013/0201270 A1* | 8/2013 | Kudo | ............... | G02B 26/123 |
| | | | | 347/235 |
| 2016/0161881 A1* | 6/2016 | Shirahata | ............... | G03G 15/043 |
| | | | | 347/118 |
| 2016/0347083 A1* | 12/2016 | Ishidate | ............... | B41J 2/471 |
| 2018/0106998 A1* | 4/2018 | Furuta | ............... | G03G 15/50 |
| 2018/0333970 A1* | 11/2018 | Iida | ............... | B41M 5/5218 |
| 2018/0342967 A1* | 11/2018 | Ogura | ............... | H02P 8/14 |
| 2019/0324380 A1* | 10/2019 | Nakajima | ............... | G03G 15/043 |
| 2020/0374416 A1* | 11/2020 | Tanaka | ............... | G02B 26/127 |
| 2021/0033851 A1* | 2/2021 | Kobayashi | ............... | G03G 15/04072 |
| 2021/0041801 A1* | 2/2021 | Ohta | ............... | H04N 1/0283 |
| 2021/0132521 A1* | 5/2021 | Yamamoto | ............... | G03G 15/04072 |

FOREIGN PATENT DOCUMENTS

| | | |
|---|---|---|
| JP | 2004-085686 A | 3/2004 |
| JP | 2004-142441 A | 5/2004 |
| JP | 2004-170755 A | 6/2004 |
| JP | 2009-069433 A | 4/2009 |
| JP | 2010-145754 A | 7/2010 |
| JP | 2016-139019 A | 8/2016 |

* cited by examiner

FIG. 4A (a) PHASE CONTROL ON SIGNAL
(b) REFERENCE PHASE SIGNAL 121
(c) PHASE POSITION SIGNAL
(d) PHASE POSITION SIGNAL COUNTER
(e) BD SIGNAL 114a, 114b
(f) BD SIGNAL COUNTER
(g) PHASE DRIVE SIGNAL 116a, 116b (DECELERATION SIGNAL)

FIG. 4B (c) PHASE POSITION SIGNAL
(e) BD SIGNAL 114a, 114b
(h) DIFFERENCE COUNTER
(i) PULSE GENERATION COUNTER
(g) PHASE DRIVE SIGNAL 116a, 116b (DECELERATION SIGNAL)

FIG. 4C (a) PHASE CONTROL ON SIGNAL
(b) REFERENCE PHASE SIGNAL 121
(c) PHASE POSITION SIGNAL
(d) PHASE POSITION SIGNAL COUNTER
(e) BD SIGNAL 114a, 114b
(f) BD SIGNAL COUNTER
(g) PHASE DRIVE SIGNAL 116a, 116b (ACCELERATION SIGNAL)

FIG. 4D (c) PHASE POSITION SIGNAL
(e) BD SIGNAL 114a, 114b
(h) DIFFERENCE COUNTER
(i) PULSE GENERATION COUNTER
(g) PHASE DRIVE SIGNAL 116a, 116b (ACCELERATION SIGNAL)

IMAGE FORMING APPARATUS

BACKGROUND

Field of the Disclosure

The present disclosure relates to an image forming apparatus, and more particularly, to an image forming apparatus, such as a copying machine and a printer, which has a function of forming an image on a recording material (recording medium), for example, a sheet.

Description of the Related Art

Figure 9:
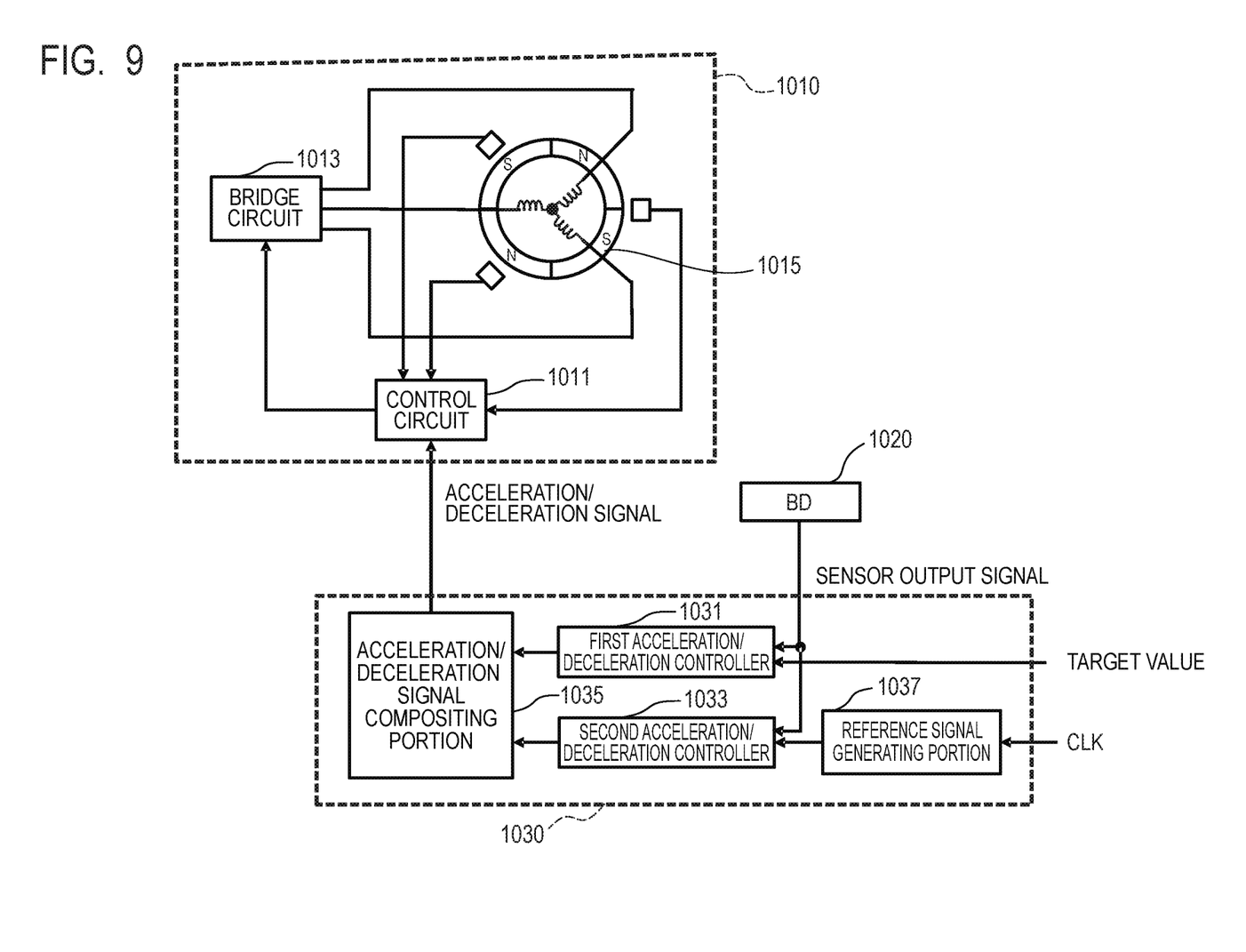
FIG. 9 is a control block diagram of a related-art scanner motor.

FIG. 9 is a control block diagram of a related-art scanner motor 1010. For example, as disclosed in Japanese Patent Application Laid-Open No. 2003-127456, there is a related-art scanning optical device that uses in combination an acceleration/deceleration controller 1030 as a rotation controller for the scanner motor 1010. In a scanning optical device including a plurality of scanner motors 1010, two control circuits (1031 and 1033) are used in combination for each scanner motor 1010 to control the rotation period and rotation phase of each scanner motor 1010. At this time, a signal for phase control may hinder the control of the rotation period of the scanner motor 1010, and may cause an increase in rotation jitter. This phenomenon appears more conspicuously when a rotation portion of the scanner motor 1010 is light in weight with a low rotation speed. A DC motor used for the scanner motor 1010 is liable to become unstable when the rotation portion is light in weight with a low rotation speed. Therefore, the rotation jitter of the scanner motor 1010 is more liable to increase, and the rotation phase tends to shift.

In addition, for example, as in Japanese Patent Application Laid-Open No. 2016-139019, there is disclosed a technology for adjusting the interior angles of a rotary polygon mirror to specify a reflection face. In a scanner motor including the rotary polygon mirror having its interior angles adjusted, the rotation period is not the same for each reflection face, and is therefore liable to become unstable. For example, in Japanese Patent Application Laid-Open No. 2004-085686, there is proposed a configuration in which a loop filter for PLL control is switched for each control rotation speed of a scanner motor. In addition, for example, in Japanese Patent Application Laid-Open No. 2009-069433, there is disclosed a configuration in which the signal width of an acceleration/deceleration signal of a scanner motor, which is involved in phase control, is adjusted based on a phase shift amount.

In recent years, there have been demands for reductions in power consumption and size of an image forming apparatus and a reduction in activation time of a scanner motor. There has also been a demand for a reduction in weight of the rotation portion of the scanner motor. In addition, the image forming apparatus has a plurality of image forming speeds in order to support a plurality of types of recording materials. There are also a plurality of rotation speeds (hereinafter referred to as "steady rotation speeds") of the scanner motor at the time of image formation in association with the plurality of image forming speeds, and a difference between the steady rotation speeds almost reaches as high as 10,000 rpm in some cases. In this case, in rotation control for the scanner motor having rotation phase control, it is difficult to accurately rotate the scanner motor under control with a plurality of steady rotation speeds and the same rotation phase.

For example, the configuration in which a loop filter for PLL control is switched for each rotation speed can be expected to produce an effect of reduction in electrical noise and other such problems, but may fail to produce a sufficient effect as a countermeasure against an increase in rotation jitter (rotation speed fluctuations) ascribable to a reduction in weight of the rotation portion. Meanwhile, in the configuration in which the width of an acceleration/deceleration signal of a scanner motor, which is involved in phase control, is changed between the time of activation and the time of steady rotation, there is produced an effect in shortening a convergence time when the scanner motor is activated. However, this configuration causes a fear of failing to produce a sufficient effect as a countermeasure against the increase in rotation jitter at the time of the steady rotation of the scanner motor.

SUMMARY

The present disclosure has been made in view of the above-mentioned circumstances, and improves image quality by optimizing rotation jitter for each steady rotation speed of a scanner motor.

According to an embodiment of the present disclosure, there is provided an image forming apparatus configured to form an image on a recording material at an image forming speed corresponding to a type of the recording material, the image forming apparatus including a deflection unit which includes a rotary polygon mirror configured to deflect a light beam emitted from a light source and a drive unit configured to rotate the rotary polygon mirror. A first output unit configured to detect the light beam deflected by the deflection unit to output a first signal, a second output unit configured to output a second signal to be used as a reference when phase control is performed on the rotary polygon mirror, and a first controller configured to perform the phase control based on the first signal and the second signal. Wherein the first controller is configured to perform the phase control in accordance with a condition set based on a rotation speed of the drive unit corresponding to the image forming speed, and wherein the first controller is configured to perform the phase control by outputting a drive signal having a predetermined pulse width to the drive unit to accelerate or decelerate the drive unit so that the first signal and a position signal, based on the second signal, substantially match. The condition being a pulse width of the drive signal and/or a frequency of performing the phase control.

Further features of the present disclosure will become apparent from the following description of exemplary embodiments with reference to the attached drawings.

DESCRIPTION OF THE EMBODIMENTS

Now, exemplary embodiments for carrying out the present disclosure are illustratively described below in detail with reference to the accompanying drawings. However, specifications and other points of a configuration described below in the embodiments are to be appropriately changed depending on a configuration of an apparatus to which the disclosure is applied and on various conditions, and are not intended to limit the scope of the present disclosure to the following embodiments.

General Control Block Diagram of Scanner Motor

FIG. 9 is a general control block diagram of a scanner motor 1010. The scanner motor 1010 includes a control circuit 1011, a bridge circuit 1013, and a rotor 1015. An acceleration/deceleration controller 1030 outputs an acceleration/deceleration signal for controlling the scanner motor 1010 to the control circuit 1011 based on a sensor output signal output from a beam detector (referred to as "BD") 1020. The acceleration/deceleration controller 1030 includes a first acceleration/deceleration controller 1031, a second acceleration/deceleration controller 1033, an acceleration/deceleration signal compositing portion 1035, and a reference signal generating portion 1037. The reference signal generating portion 1037 generates a reference signal based on a clock signal (referred to as "CLK"), and outputs the reference signal to the second acceleration/deceleration controller 1033. The first acceleration/deceleration controller 1031 outputs a signal for controlling a rotation period of the scanner motor 1010 to the acceleration/deceleration signal compositing portion 1035 based on a target value and the sensor output signal. The second acceleration/deceleration controller 1033 outputs a signal for controlling a rotation phase of the scanner motor 1010 to the acceleration/deceleration signal compositing portion 1035 based on the reference signal and the sensor output signal. The acceleration/deceleration signal compositing portion 1035 outputs to the control circuit 1011 an acceleration/deceleration signal obtained by compositing the signal input from the first acceleration/deceleration controller 1031 and the signal input from the second acceleration/deceleration controller 1033.

Embodiment

Image Forming Apparatus

Figure 1:
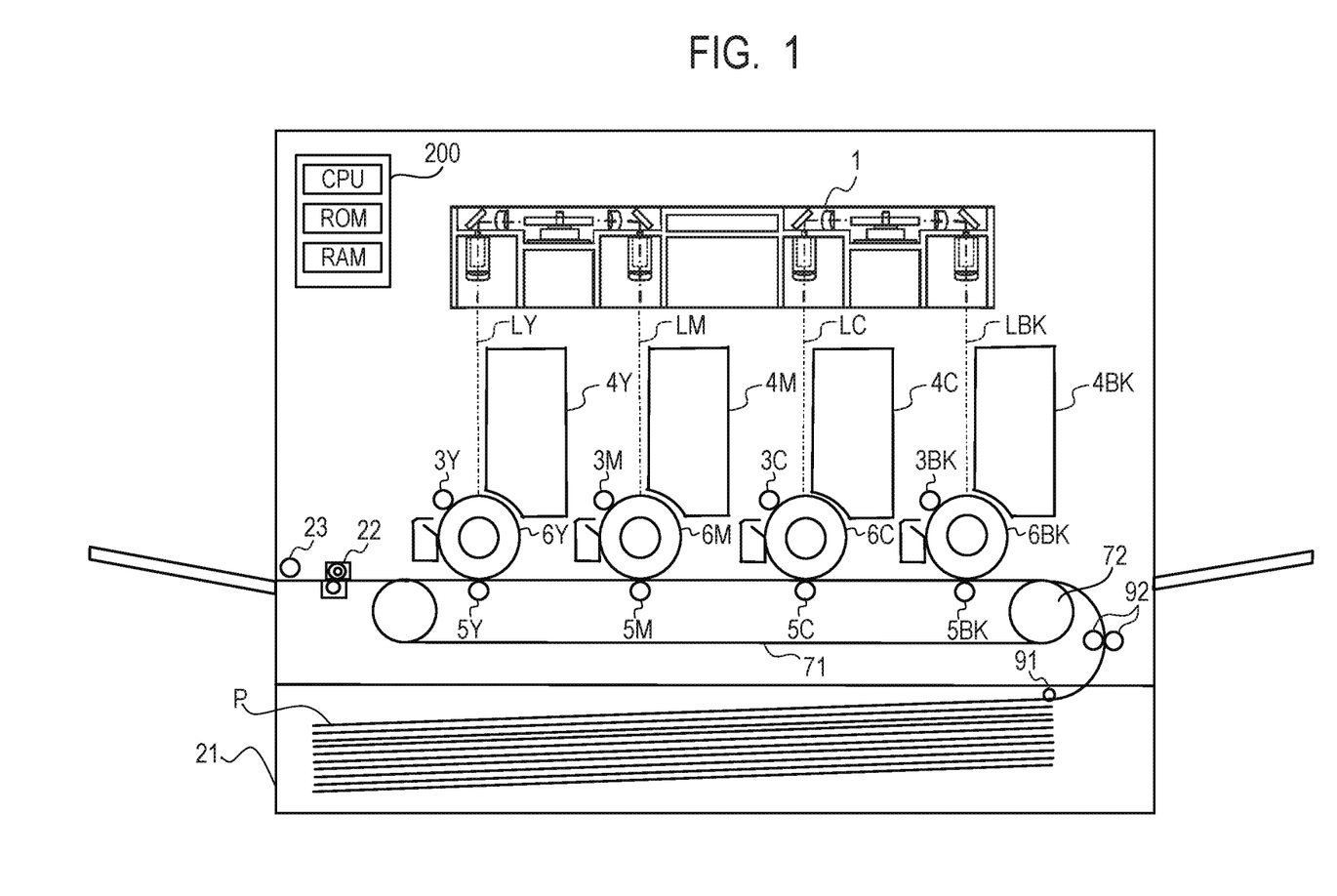
FIG. 1 is a schematic cross-sectional view of an image forming apparatus according to an embodiment.

FIG. 1 is a cross-sectional view of an image forming apparatus. An image forming operation to be performed by members involved in image formation is described with reference to FIG. 1. Photosensitive drums 6Y, 6M, 6C, and 6BK, which are image bearing members, are uniformly charged by primary chargers 3Y, 3M, 3C, and 3BK, respectively. A scanning optical device 1 emits laser beam fluxes (laser beams or light beams) LY, LM, LC, and LBK, each of which is optically modulated based on image information. The laser beam fluxes LY, LM, LC, and LBK emitted from the scanning optical device 1 irradiate their corresponding faces of the photosensitive drums 6Y, 6M, 6C, and 6BK to form electrostatic latent images. In this case, the suffixes Y, M, C, and BK of the reference symbols represent yellow, magenta, cyan, and black, respectively, and are omitted below unless a member relating to a specific color is described. The laser beam fluxes LY, LM, LC, and LBK may also be collectively referred to as "laser beam flux L". The respective latent images formed on the photosensitive drums 6 (on the image bearing members) are visualized into toner images of yellow, magenta, cyan, and black by corresponding developing devices 4. After that, the toner images of the respective colors are sequentially transferred by transfer rollers 5 in a superimposed manner onto a recording material P, which is being conveyed on a conveying belt 71, to thereby form a color image.

Recording materials P are placed on a feeding tray 21, and are fed by a feeding roller 91 one by one in order. The recording material P is fed onto the conveying belt 71 by registration rollers 92 in synchronization with an image writing timing. While the recording material P is being accurately conveyed on the conveying belt 71, the respective toner images of black, cyan, magenta, and yellow formed on the photosensitive drums 6 are sequentially transferred to form a color image. The drive roller 72 accurately rotates the conveying belt 71, and is connected to a motor (not shown) having small rotation unevenness. The unfixed color mage formed on the recording material P is thermally fixed by a fixing device 22, and is then conveyed by, for example, a delivery roller 23 to be output to the outside of the apparatus.

The image forming apparatus includes an engine controller 200 for controlling various operations of the image forming apparatus. The engine controller 200 includes, for example, a CPU, a ROM configured to store various programs and data to be required for executing the programs, and a RAM to be used as a working memory. The image forming apparatus according to the embodiment has a plurality of image forming speeds in order to support a plurality of types of recording materials. The above-mentioned image forming apparatus according to the embodiment includes the conveying belt 71, but the image forming apparatus may include an intermediate transfer belt.

Scanning Optical Device

Figure 2A:
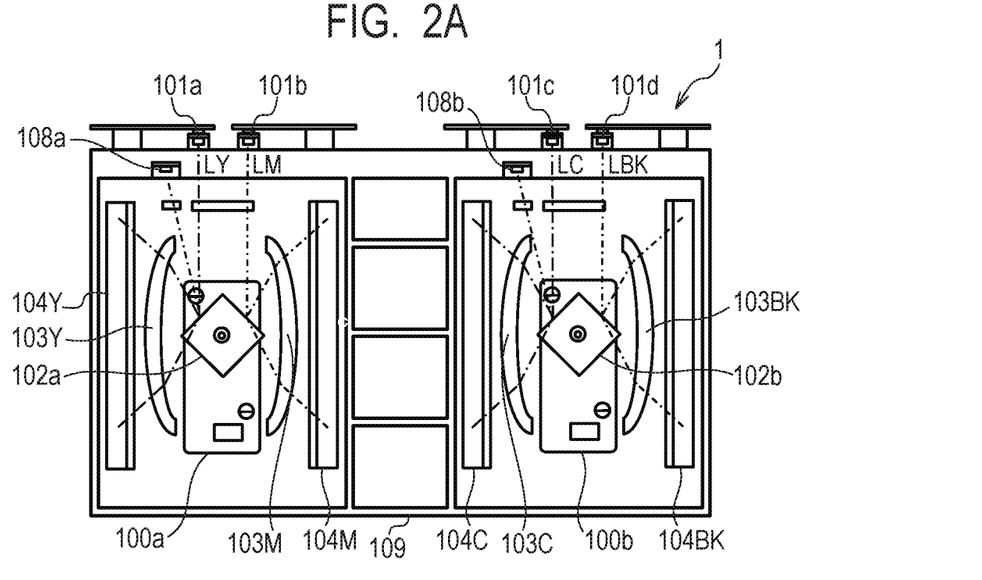
FIG. 2A and FIG. 2B are schematic views of a scanning optical device in the embodiment.
Figure 2B:
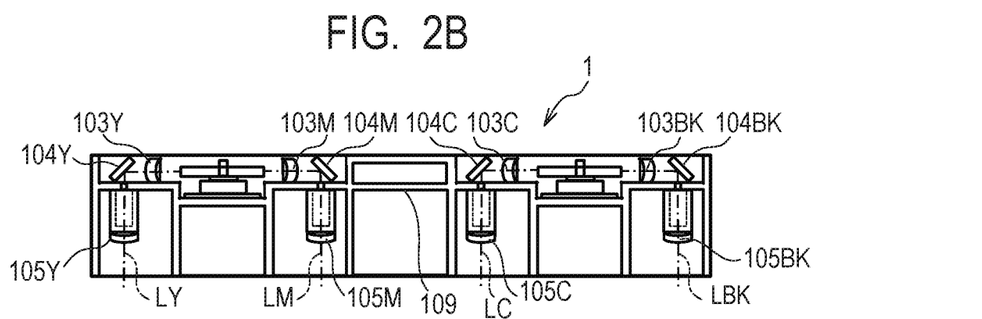

FIG. 2A and FIG. 2B are schematic diagrams for illustrating a configuration of the scanning optical device 1. FIG. 2A is a top view, and FIG. 2B is a cross-sectional view. The laser beam fluxes LY, LM, LC, and LBK emitted from semiconductor lasers 101a, 101b, 101c, and 101d, respectively, which serve as light source units, enter different faces of rotary polygon mirrors 102a and 102b, which form a deflection scanning unit, to be scanned in mutually different directions. The scanning optical device 1 in the embodiment thus includes two rotary polygon mirrors 102a and 102b. In addition, the rotary polygon mirrors 102a and 102b each have four faces. The number of faces of each of the rotary polygon mirrors 102a and 102b is not limited to four. One rotary polygon mirror 102a (or 102b) deflects two laser beam fluxes L by different faces.

On scanning planes of the laser beam fluxes LY and LC scanned by the rotary polygon mirrors 102a and 102b (planes defined by the laser beam fluxes L being scanned), there are provided beam detectors (hereinafter referred to as "BDs") 108a and 108b, respectively, on a one-to-one basis. The BDs 108a and 108b are each formed of, for example, a photosensor, and detect timings at which the laser beam fluxes LY and LC are scanned, respectively, to thereby each generate and output a signal (hereinafter referred to as "BD signal"). The image forming apparatus controls the image writing timing based on the BD signal being a first signal output from each of the BDs 108a and 108b being first output units. Specifically, the image forming apparatus performs phase control on the BD signals in order to match writing start positions of the respective colors (respective photosensitive members). The BD signals are signals for detecting the writing start positions of the two rotary polygon mirrors 102a and 102b. Therefore, phase controllers, which are described later, perform the phase control corresponding to the respective colors (for example, Y and C) with a clock signal being used as a reference signal to be a reference of the phase control, to thereby enable the two rotary polygon mirrors 102a and 102b to have the matched phases.

The laser beam fluxes LY, LM, LC, and LBK scanned by the rotary polygon mirrors 102a and 102b are imaged on the four photosensitive drums 6 as described with reference to FIG. 1. The laser beam fluxes LY, LM, LC, and LBK may be hereinafter referred to collectively as "laser beam flux L". First, the laser beam fluxes L are transmitted through respective first scanning lenses 103. Then, the angles of the laser beam fluxes L are changed by folding mirrors 104 serving as folding members arranged with the same pitch as that of the photosensitive drums 6 so as to each have the same angle with respect to the incident light beam flux. In this case, the pitch of the photosensitive drams 6 refers to a distance between each adjacent pair of photosensitive drums 6 illustrated in FIG. 1. The laser beam fluxes L having their angles changed by the folding mirrors 104 are transmitted through second scanning lenses 105 to be imaged on the four photosensitive drums 6 as scanning light.

The scanning optical device 1 includes, in a single casing 109, deflection units which include the rotary polygon mirrors 102a and 102b and scanner motors (drive units) 100a and 100b configured to rotate the rotary polygon mirrors 102a and 102b, respectively. The scanner motors 100a and 100b are mounted to the casing 109 by fastening circuit boards of the scanner motors 100a and 100b to the casing 109 with, for example, screws. When a plurality of scanner motors 100a and 100b are provided as in the above-mentioned configuration, it is required to control the phases of the rotation of the rotary polygon mirrors 102a and 102b in order to control the imaging positions of the respective laser beam fluxes L on the photosensitive drums 6. In the following description, the suffixes of the reference symbols of, for example, the rotary polygon mirrors 102a and 102b and the scanner motors 100a and 100b may be omitted to be referred to collectively as, for example, the rotary polygon mirror 102 and the scanner motor 100, respectively.

Scanner Motor

Figure 2C:
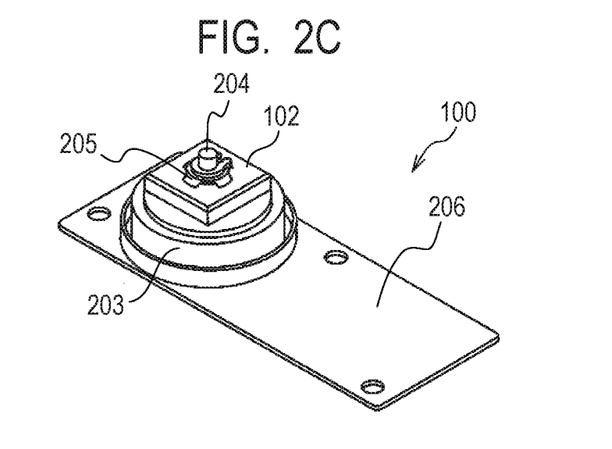
FIG. 2C is a schematic perspective view of a scanner motor in the embodiment.

FIG. 2C is a perspective view of the scanner motor 100. The scanner motor 100 includes the rotary polygon mirror 102, a rotor 203, a rotary shaft 204, a leaf spring 205, and a circuit board 206. In this case, the rotary polygon mirror 102 reflects the laser beam flux L to guide the laser beam flux L to the first scanning lens 103. The rotor 203 has the rotary polygon mirror 102 mounted thereon, and is rotated integrally with the rotary polygon mirror 102. The leaf spring 205 presses and fixes the rotary polygon mirror 102 to the rotor 203. When the scanner motor 100 is rotated, there occur, as internal losses, a windage loss and a bearing loss due to the use of a fluid bearing. In recent years, the weight of a rotation portion of the scanner motor 100, namely, the weight of the members of the rotary polygon mirror 102, the rotor 203, and the leaf spring 205 has been greatly reduced, and rotation control for the scanner motor 100 has become susceptible to a windage loss and a bearing loss of the scanner motor 100.

Control Block Diagram

Figure 3:
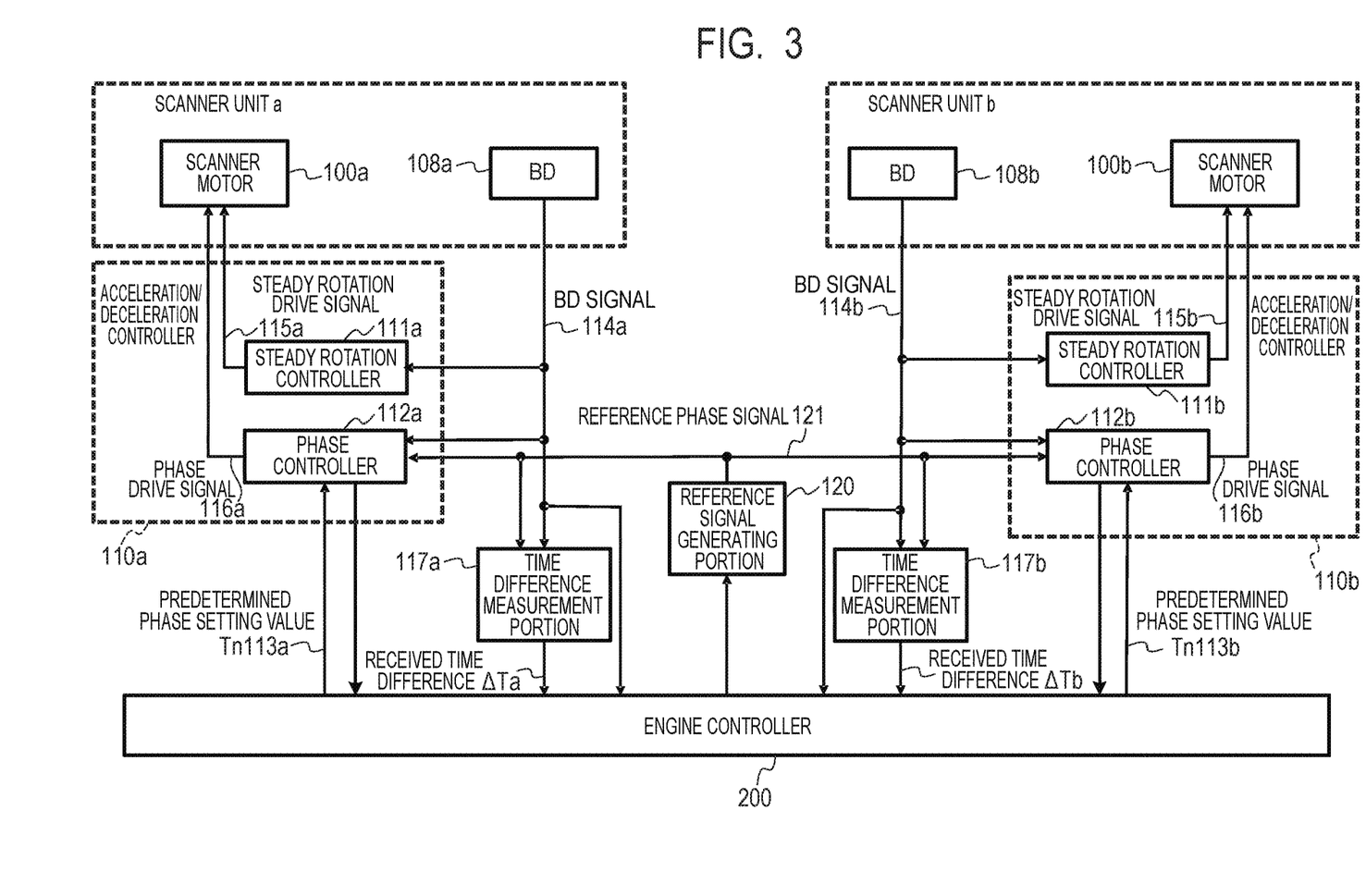
FIG. 3 is a control block diagram of the scanner motor in the embodiment.

A control method for the scanner motor 100 in the embodiment is described. FIG. 3 is a control block diagram of the scanner motor 100 in the embodiment. In this case, the scanner motor 100a and the BD 108a form a scanner unit "a". The scanner motor 100b and the BD 108b form a scanner unit "b". An acceleration/deceleration controller 110a controls the scanner motor 100a, and an acceleration/deceleration controller 110b controls the scanner motor 100b. The acceleration/deceleration controllers 110a and 110b include steady rotation controllers 111a and 111b and phase controllers 112a and 112b, respectively. The acceleration/deceleration controllers 110a and 110b receive BD signals 114a and 114b, and use steady rotation drive signals 115a and 115b and phase drive signals 116a and 116b to control the rotation of the scanner motors 100a and 100b, respectively.

The steady rotation controller 111 being a second controller uses the BD signal 114 to measure a period (hereinafter referred to as "BD period") of a BD signal corresponding to the rotation speed of the scanner motor 100, and generates the steady rotation drive signal 115 so that the BD period becomes a target period. In this manner, the steady rotation controller 111 performs steady rotation control for controlling the rotation speed of the scanner motor 100 so as to reach a steady rotation speed. As described above, the steady rotation speed refers to the rotation speed of the scanner motor 100 exhibited during image formation corresponding to each of a plurality of image forming speeds. The target period of the BD period is set based on the image forming speed (namely, the type of the recording material P). The steady rotation controller 111 accelerates the scanner motor 100 when the BD period is greater (longer) than the target period, and decelerates the scanner motor 100 when the BD period is less (shorter) than the target period. Thus, the steady rotation controller 111 performs speed control for causing the rotation speed (namely, rpm) of the scanner motor 100 to converge on a target rotation speed. In the above-mentioned example, the method of using a BD signal has been described as a method of measuring the rotation speed of the scanner motor 100, but the present disclosure is not limited thereto. For example, there may be employed a method of providing a drive motor for rotating the rotary polygon mirror 102 with a magnetic pattern and a detection element (Hall element) configured to detect the magnetic pattern, and measuring the rotation speed through use of an FG signal being a signal obtained from the detection element.

The phase controller 112 being a first controller generates the phase drive signal 116 through use of a reference phase signal 121 generated by a reference signal generating portion 120 and the BD signal 114. An operation of the phase controller 112 is described later. The reference signal generating portion 120 being a second output unit outputs the same reference phase signal 121 (second signal) to the phase controllers 112a and 112b. The reference phase signal 121 is a signal generated based on a reference period set by the engine controller 200. The engine controller 200 sets the reference period based on the image forming speed. That is, the reference phase signal 121 may also be regarded as a signal corresponding to the image forming speed.

Time difference measurement portions 117a and 117b use the BD signals 114a and 114b and the reference phase signal 121 to measure received time differences ΔTa and ΔTb, respectively. The received time differences ΔTa and ΔTb measured by the time difference measurement portions 117a and 117b are transmitted to the engine controller 200. The engine controller 200 uses the received time differences ΔTa and ΔTb to calculate predetermined phase setting values Tn113a and Tn113b, and outputs (sets) the predetermined phase setting values Tn113a and Tn113b to the phase controllers 112a and 112b, respectively. In this case, the predetermined phase setting values Tn113 are calculated and set based not only on the received time differences ΔTa and ΔTb but also on a detection result acquired from a registration sensor (not shown) by the engine controller 200. That is, the predetermined phase setting values Tn113 are calculated and set based on a conveyance timing of the recording material P. The predetermined phase setting values Tn113 are calculated by a known method, for example, the method disclosed in Japanese Patent Application Laid-Open No. 2004-170755.

Timing Chart of Phase Controller

Figure 4A:
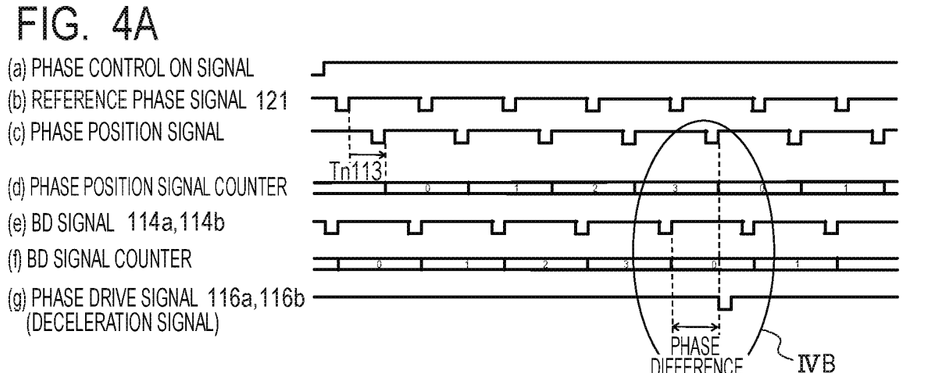
FIG. 4A, FIG. 4B, FIG. 4C, and FIG. 4D are timing charts for showing an operation of a phase controller in the embodiment.
Figure 4B:
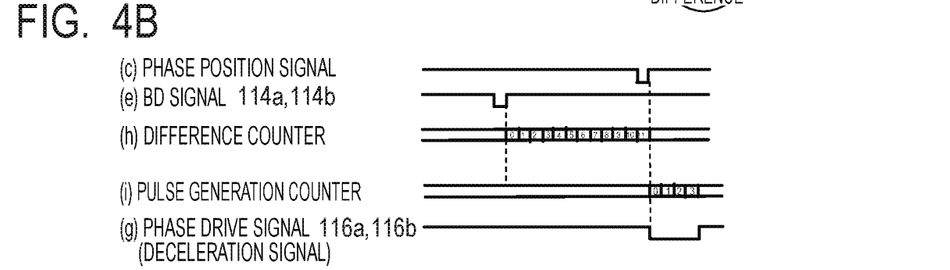
Figure 4C:
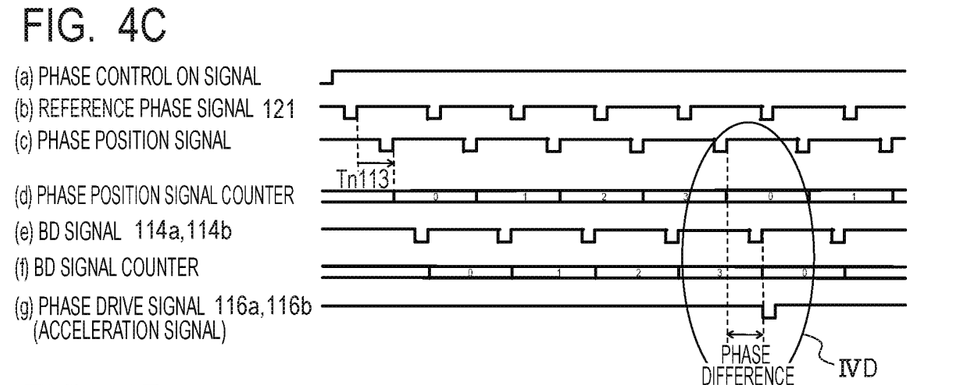
Figure 4D:
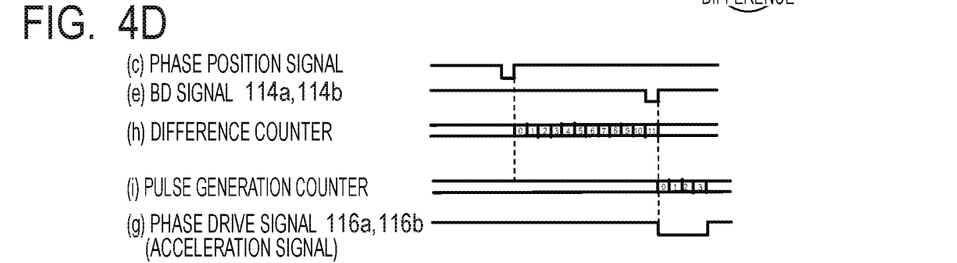

FIG. 4A and FIG. 4C are timing charts of input/output signals of the phase controller 112. FIG. 4A shows a case in which a deceleration signal is output as the phase drive signal 116, and FIG. 4C shows a case in which an acceleration signal is output as the phase drive signal 116. For the later description of a method of obtaining a phase difference, FIG. 4B is an enlarged view of the enclosed portion IVB of FIG. 4A, and FIG. 4D is an enlarged view of the enclosed portion IVD of FIG. 4C. In FIG. 4A and FIG. 4C, part (a) indicates a waveform of a phase control ON signal, part (b) indicates a waveform of the reference phase signal 121, and part (c) indicates a waveform of a phase position signal. In FIG. 4A and FIG. 4C, part (d) indicates a value of a phase position signal counter, part (e) indicates a waveform of the BD signal 114, part (f) indicates a value of a BD signal counter, and part (g) indicates a waveform of the phase drive signal 116 (deceleration signal or acceleration signal). In addition, in the enlarged views of FIG. 4B and FIG. 4D, part (h) indicates a value of a difference counter, and part (i) indicates a value of a pulse generation counter. It is assumed that the phase controller 112 includes the phase position signal counter, the BD signal counter, the difference counter, and the pulse generation counter.

The phase controller 112 illustrated in FIG. 3 generates a phase position signal (position signal) obtained by shifting the reference phase signal 121 by the predetermined phase setting value Tn113 as illustrated in FIG. 4A and FIG. 4C. Specifically, the phase controller 112 generates a phase position signal so that a time from the timing of a falling edge of the reference phase signal 121 until the timing of a falling edge of the phase position signal becomes the predetermined phase setting value Tn113. The phase controller 112 may generate a phase position signal so that a time from the timing of a rising edge of the reference phase signal 121 until the timing of a rising edge of the phase position signal becomes the predetermined phase setting value Tn113. Subsequently, the phase controller 112 generates the phase drive signal 116 so that the phase position signal and the BD signal 114 substantially match each other, to thereby control the rotation of the scanner motor 100. In other words, the phase controller 112 generates the phase drive signal 116 so that a difference between the phase position signal and the BD signal 114 becomes substantially zero, to thereby control the rotation of the scanner motor 100.

When a phase control ON signal is input to the phase controller 112, the phase controller 112 starts to perform counting based on the BD signal counter and the phase position signal counter. The BD signal counter counts the BD signal 114. That is, the BD signal counter (with the initial value set to, for example, 0) increments the value of the counter by one each time the BD signal 114 is input to the phase controller 112. The phase position signal counter counts the phase position signal. That is, the phase position signal counter (with the initial value set to, for example, 0) increments the value of the counter by one each time the phase controller 112 generates a phase position signal. The time difference measurement portion 117 uses the difference counter to detect a time difference (difference) between the phase position signal and the BD signal 114a that are received when the respective count values reach the value set by the engine controller 200 (hereinafter referred to as "phase difference"). For example, in FIG. 4A and FIG. 4C, the phase controller 112 detects, as the phase difference, a time difference between the timings of the rising edges of the phase position signal and the BD signal 114 that are received when the respective count values reach 3 after starting from 0. The phase controller 112 may detect the phase difference based on the timings of the falling edges of the respective signals. When the phase difference detected by the difference counter becomes smaller than a predetermined value, the phase controller 112 completes the phase control. Thus, the phase controller 112 performs the phase control by outputting, to the scanner motor 100, a phase drive signal having such a predetermined pulse width as to accelerate or decelerate the scanner motor 100 so that the BD signal 114 and the phase position signal substantially match each other. The phase controller 112 notifies the engine controller 200 that the phase control has been completed (this state is hereinafter referred to as "phase locking").

The phase difference is measured through use of the phase position signal exhibited when the phase position signal counter indicates 3 and the BD signal 114 exhibited when the BD signal counter indicates 3. In FIG. 4A, the BD signal 114 has arrived before (earlier than) the phase position signal, and hence the phase controller 117 outputs the deceleration signal to the scanner motor 100 as the phase drive signal 116. For example, the phase controller 112 starts the difference counter after receiving the BD signal 114 to count from 0, and receives the phase position signal when the count value reaches 11. The phase controller 112 keeps outputting the phase driving signal 116 (deceleration signal) to the scanner motor 100 after the count value of the pulse generation counter starts from 0 until reaching 3.

Meanwhile, in FIG. 4C, the phase controller 112 counts the phase difference through use of the respective signals exhibited when the phase position signal counter and the BD signal counter each indicate 3 in the same manner as in the case of the deceleration. In FIG. 4C, the phase position signal has arrived before (earlier than) the BD signal 114, and hence the phase controller 112 outputs the acceleration signal to the scanner motor 100 as the phase drive signal 116. For example, the phase controller 112 starts the difference counter after receiving the phase position signal to count from 0, and receives the BD signal 114 when the count value reaches 11. The phase controller 112 keeps outputting the phase driving signal 116 (acceleration signal) to the scanner motor 100 after the count value of the pulse generation counter starts from 0 until reaching 3.

Regarding Phase Control Gain and Phase Control Division Ratio

A ratio of a pulse width (for example, 4 (count value 3+1)) of the phase drive signal 116 to the phase difference (for example, 12 (count value 11+1)) corresponds to the phase control gain in the embodiment. In FIG. 4A, FIG. 43, FIG. 4C, and FIG. 4D, the phase controller 112 outputs the phase drive signal 116 having a pulse width with a phase difference of $1/3$ ($=4/12$). That is, in this case, the phase control gain is $1/3$. In the embodiment, the phase control gain is changed based on the steady rotation speed of the scanner motor 100 (namely, based on the image forming speed).

In addition, the number of times that the phase controller 112 receives the reference phase signal 121 from the reference signal generating portion 120 before the phase controller 112 performs the phase control, that is, what indicates the frequency of the phase control, is hereinafter referred to as "phase control division ratio". For example, a phase control division ratio of 1 indicates that the phase controller 112 performs the phase control each time the phase controller 112 receives the reference phase signal 121. In a case of a phase control division ratio of 4, the phase controller 112 performs the phase control each time the phase controller 112 has received the reference phase signal 121 four times. The phase controller 112 may also be considered to perform the phase control at a frequency being an integral multiple of a period at which the reference phase signal 121 is output. In the embodiment, the phase control division ratio is changed based on the steady rotation speed of the scanner motor 100 (namely, based on the image forming speed).

When the steady rotation speed (rpm) of the scanner motor 100 is low, the scanner motor 100 is liable to become unstable due to, tor example, a windage loss and a bearing loss, and rotation jitter is liable to increase. For example, according to studies conducted by the inventors, a scanner motor including the rotation portion having inertia of about 2 g·cm², the rotary polygon mirror 102 having a size of 15 mm×15 mm×2 mm, and the fluid bearing having a total length of about 10 mm, is liable to become unstable from about 20,000 rpm. Therefore, it is required to optimize the values of the phase control gain and the phase control division ratio based on the steady rotation speed of the scanner motor 100. In FIG. 4A, FIG. 4B, FIG. 4C, and FIG. 4D, the case in which the phase control gain is $1/3$, the phase control division ratio is 1, or the phase control division ratio is 4 is described, but is merely an example, and the phase control gain and the phase control division ratio are actually determined based on characteristics of the scanner motor 100.

Phase Control Processing of Scanner Motor

Figure 5:
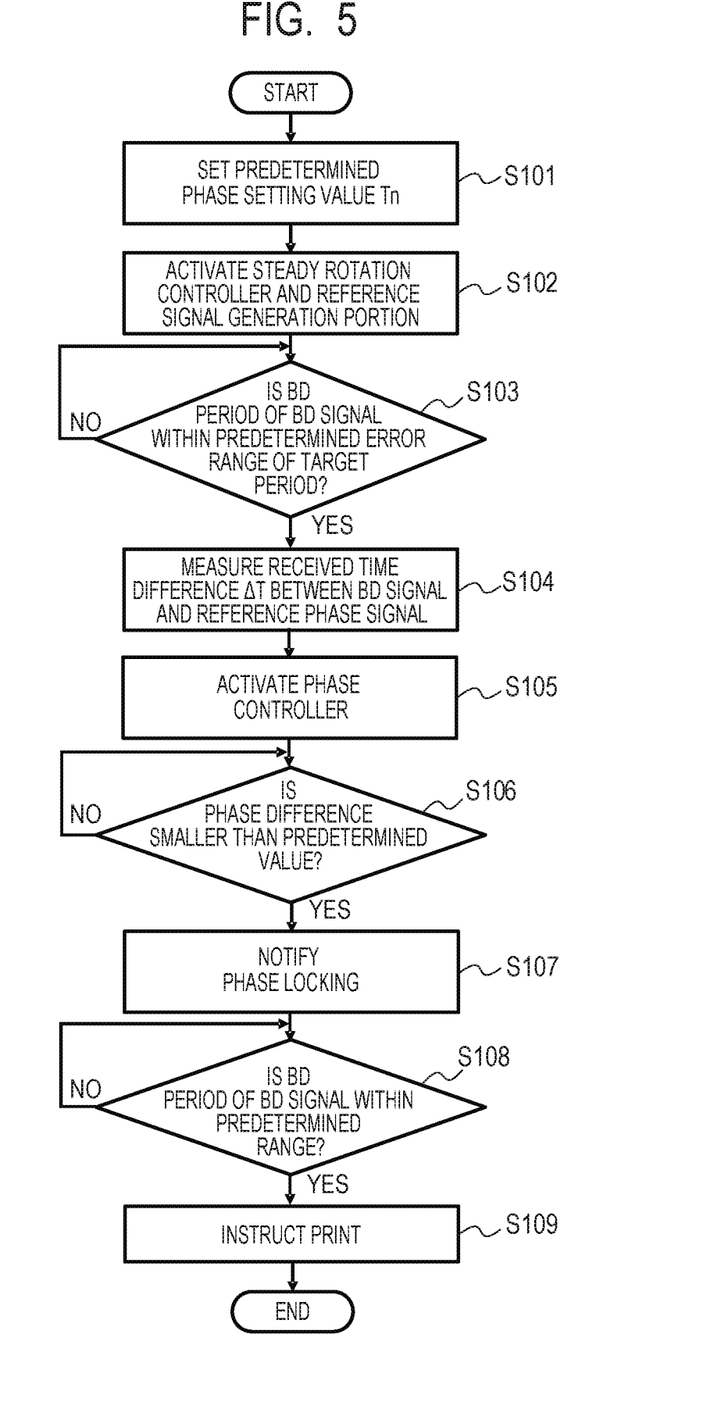
FIG. 5 is a flowchart for illustrating an image forming operation in the embodiment.

Control processing of the scanner motor 100 in the embodiment is described with reference to FIG. 5 and FIG. 3. In Step S101, the engine controller 200 calculates each predetermined phase setting value Tn113 by, for example, a known method, and sets the predetermined phase setting value Tn113 in the corresponding phase controller 112. When receiving a print start instruction, in Step S102, the engine controller 200 activates each steady rotation controller 111 and each reference signal generating portion 120. In Step S103, the engine controller 200 uses each BD signal 114 acquired from each BD 108 to determine whether or not the BD period is within a predetermined error range of the target period. During this time, the steady rotation controller 111 performs the steady rotation control on the scanner motor 100. The predetermined error range can be set and changed by the engine controller 200. When determining in Step S103 that the BD period is not within the predetermined error range, the engine controller 200 returns the processing to Step S103. When determining in Step S103 that the BD period is within the predetermined error range, the engine controller 200 advances the processing to Step S104.

In Step S104, the engine controller 200 measures each of the received time differences ΔTa and ΔTb between each BD signal 114 and the reference phase signal 121 by each of the time difference measurement portions 117a and 117b, respectively. The engine controller 200 newly sets each predetermined phase setting value Tn113 from the predetermined phase setting value Tn113 set in Step S101 and the received time difference ΔT measured in Step S104. In Step S105, the engine controller 200 outputs a phase control ON signal to each phase controller 112 to activate the phase controller 112. In this manner, the phase controller 112 performs the phase control after the BD period has reached the target period, that is, after the rotation speed of the scanner motor 100 has reached the steady rotation speed corresponding to the image forming speed. In this case, the phase controller 112 generates a phase position signal based on the predetermined phase setting value Tn113 set by the engine controller 200 and the reference phase signal 121. Then, as described with reference to FIG. 4A, FIG. 4B, FIG. 4C, and FIG. 4D, the phase controller 112 obtains a phase difference between the BD signal 114 and the phase position signal, outputs the phase drive signal 116 to the scanner motor 100 so that the phase difference becomes substantially zero, and starts the phase control of the rotation of the scanner motor 100. In Step S106, the phase controller 112 determines whether or not the phase difference is smaller than a predetermined value. When determining in Step S106 that the phase difference is equal to or larger than the predetermined value, the phase controller 112 returns the processing to Step S106. When determining in Step S106 that the phase difference is smaller than the predetermined value, the phase controller 112 advances the processing to Step S107.

In Step S107, the phase controller 112 notifies the engine controller 200 of the phase locking. After being notified of the phase locking by the phase controller 112, in Step S108, the engine controller 200 determines whether or not the BD period of the BD signal 114 is within a predetermined range. When determining in Step S108 that the BD period is not within the predetermined range, the engine controller 200 returns the processing to Step S108. In this case, the steady rotation controller 111 performs the steady rotation control on the scanner motor 100. When determining in Step S108 that the BD period is within the predetermined range, the engine controller 200 advances the processing to Step S109. In Step S109, the engine controller 200 determines that the rotation speed and the rotation phase of the scanner motor 100 have been brought into a state suitable for the recording material P on which the image is to be formed, and issues a print instruction to each component involved in the age forming operation, to thereby bring the processing to an end.

Relationship Between Rotation Speed and Rotation Jitter of Scanner Motor

Figure 6:
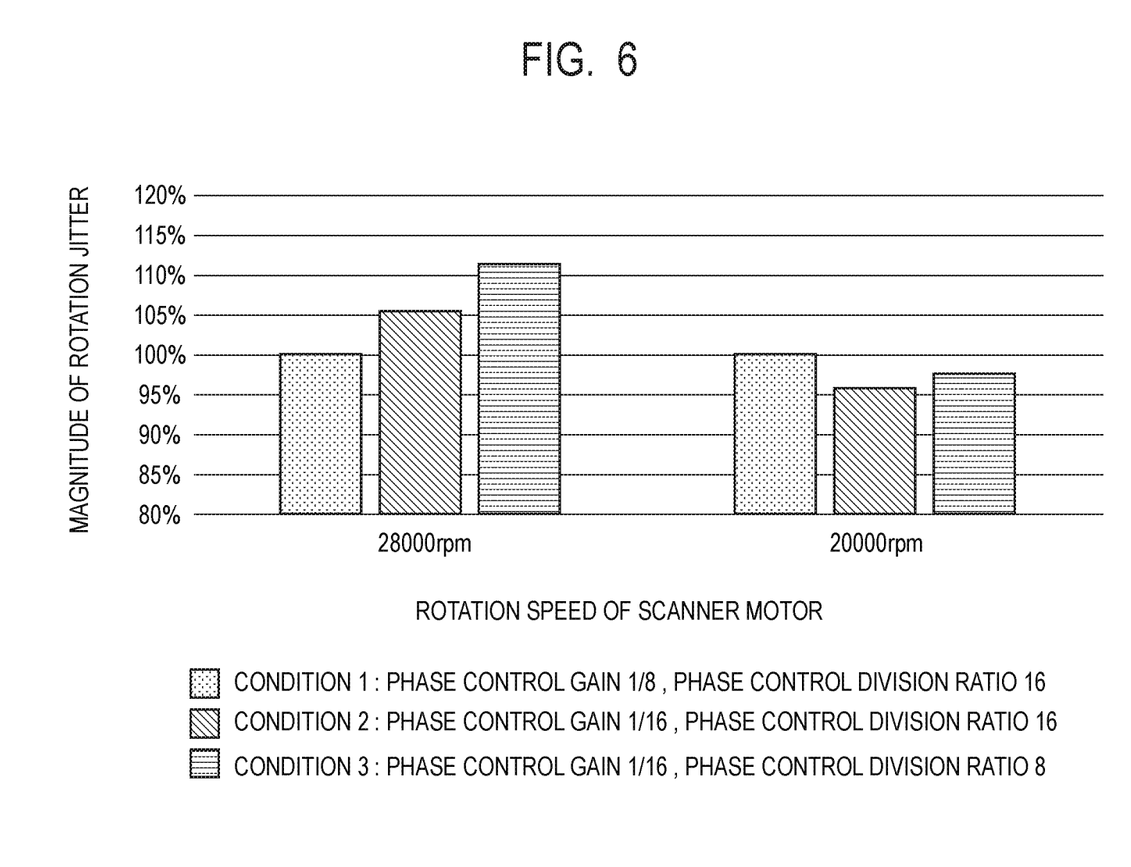
FIG. 6 is a graph for showing a relationship between a rotation speed and the amount of rotation jitter of the scanner motor in the embodiment.

FIG. 6 shows a relationship between a magnitude (amount) of the rotation jitter and a pair of the phase control gain and the phase control division ratio in the embodiment. In FIG. 6, the horizontal axis represents the steady rotation speed (rpm) of the scanner motor 100, and the vertical axis represents the magnitude of the rotation jitter in percent (%). FIG. 6 also shows relationships under three conditions. Specifically, Condition 1 is that the phase control gain is set to ⅛ and the phase control division ratio is set to 16. Condition 2 is that the phase control gain is set to 1/16 and the phase control division ratio is set to 16. Condition 3 is that the phase control gain is set to 1/16 and the phase control division ratio is set to 8. The magnitude of the rotation jitter under Condition 1 is set to 100%, to thereby normalize the magnitude of the rotation jitter under each condition.

Under a state in which the scanner motor 100 is rotating at a high speed (28,000 rpm), the rotation jitter is smaller under Condition 1 than under Conditions 2 and 3. Meanwhile, when the scanner motor 100 is rotating at a low speed (20,000 rpm), the rotation jitter is smaller under Condition 2 than under Conditions 1 and 3. That is, it is preferred to set, based on the steady rotation speed of the scanner motor 100, the phase control gain and the phase control division ratio for each steady rotation speed so as to reduce the rotation jitter. In the embodiment, the rotation jitter can be improved by about 5% to about 10% when compared to a case in which the same phase control gain and the same phase control division ratio are used irrespective of the steady rotation speed of the scanner motor 100.

In this manner, in the embodiment, control for optimizing the phase control gain and the phase control division ratio for each steady rotation speed of the scanner motor 100 is performed. That is, the phase controller 112 in the embodiment performs the phase control in accordance with the condition set based on the steady rotation speed of the scanner motor 100 (rotation speed corresponding to the image forming speed). Thus, the scanner motor 100 using the rotation control and the phase control in combination can be accurately controlled at all the steady rotation speeds to be used. Then, it is possible to achieve an image forming apparatus capable of optimizing the rotation jitter for each steady rotation speed of the scanner motor 100 to output a high-quality image.

Modification Example

Figure 7A:
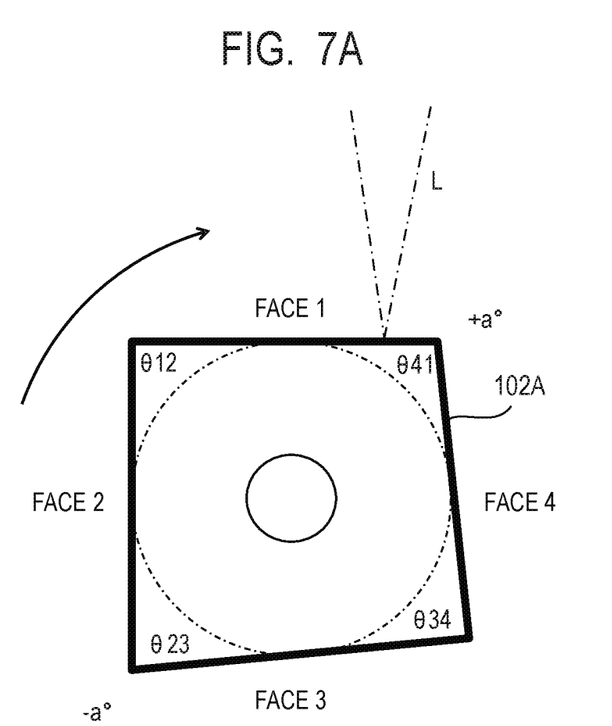
FIG. 7A is a conceptual view of a rotary polygon mirror in the embodiment.

A modification example of the embodiment is described with reference to FIG. 7A, FIG. 7B, and FIG. 8. FIG. 7A is a conceptual view of a rotary polygon mirror 102A having its interior angles adjusted. The adjustment of the interior angles of the rotary polygon minor 102A is performed, for example, to identify a reflection face. The rotary polygon minor 102A has four faces, specifically, Face 1, Face 2, Face 3, and Face 4. The interior angles of the rotary polygon mirror 102A refer to an interior angle θ12 between Face 1 and Face 2, an interior angle θ23 between Face 2 and Face 3, an interior angle θ34 between Face 3 and Face 4, and an interior angle θ41 between Face 4 and. Face 1. The rotary polygon mirror 102A is rotated in a (clockwise) direction indicated by the arrow of FIG. 7A. In this case, the interior angle θ12 and the interior angle θ34 are adjusted to 90°, the interior angle θ23 is adjusted to 90°−a°, and the interior angle θ41 is adjusted to 90°+a°.

Figure 7B:
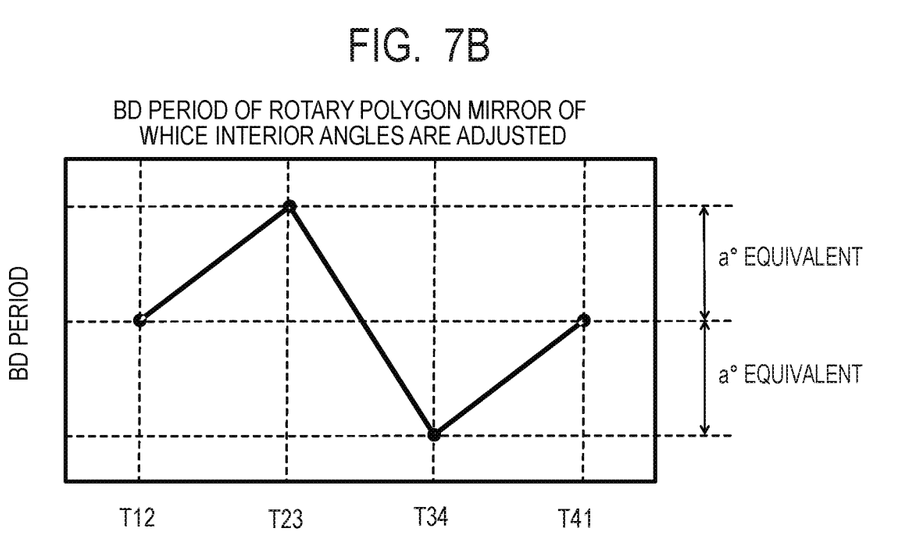
FIG. 7B is a graph for showing a BD period of the rotary polygon mirror having its interior angles adjusted in the embodiment.

In the case of the above-mentioned rotary polygon minor 102A having a quadrangular shape, the BD period is exhibited as shown in FIG. 7B. FIG. 7B is a graph for showing the BD period of the rotary polygon mirror 102A having its interior angles θ adjusted. In FIG. 7B, the horizontal axis represents the time, and the vertical axis represents the BD period. This enables the identification of a face of the rotary polygon mirror 102A. For example, T12 is a time taken after a BD signal is received on Face 1 until a BD signal is received on Face 2. T23 is a time taken after a BD signal is received on Face 2 until a BD signal is received on Face 3. T34 is a time taken after a BD signal is received on Face 3 until a BD signal is received on Face 4. T41 is a time taken after a BD signal is received on Face 4 until a BD signal is received on Face 1. The BD period changes based on the angle a° by which the interior angle θ is adjusted. That is, the BD period has a fluctuation of time corresponding to the angle a° by which the interior angle θ is adjusted.

To control the scanner motor 100 including the above-mentioned rotary polygon mirror 102A, the following method is used. That is, there is used, for example, a method of transmitting the acceleration/deceleration signal for the steady rotation control not for each face but at a timing at which the total sum of the target BD periods becomes the same, for example, each time the rotary polygon mirror 102A is rotated by one revolution. In this case, with a related-art control method, an interval between signals for the steady rotation control becomes longer, and the rotation period is more liable to be disturbed by a phase control signal. In addition, when the steady rotation speed of the scanner motor 100 is low, the interval between the signals for the steady rotation control becomes longer, and this phenomenon becomes more conspicuous.

Figure 8:
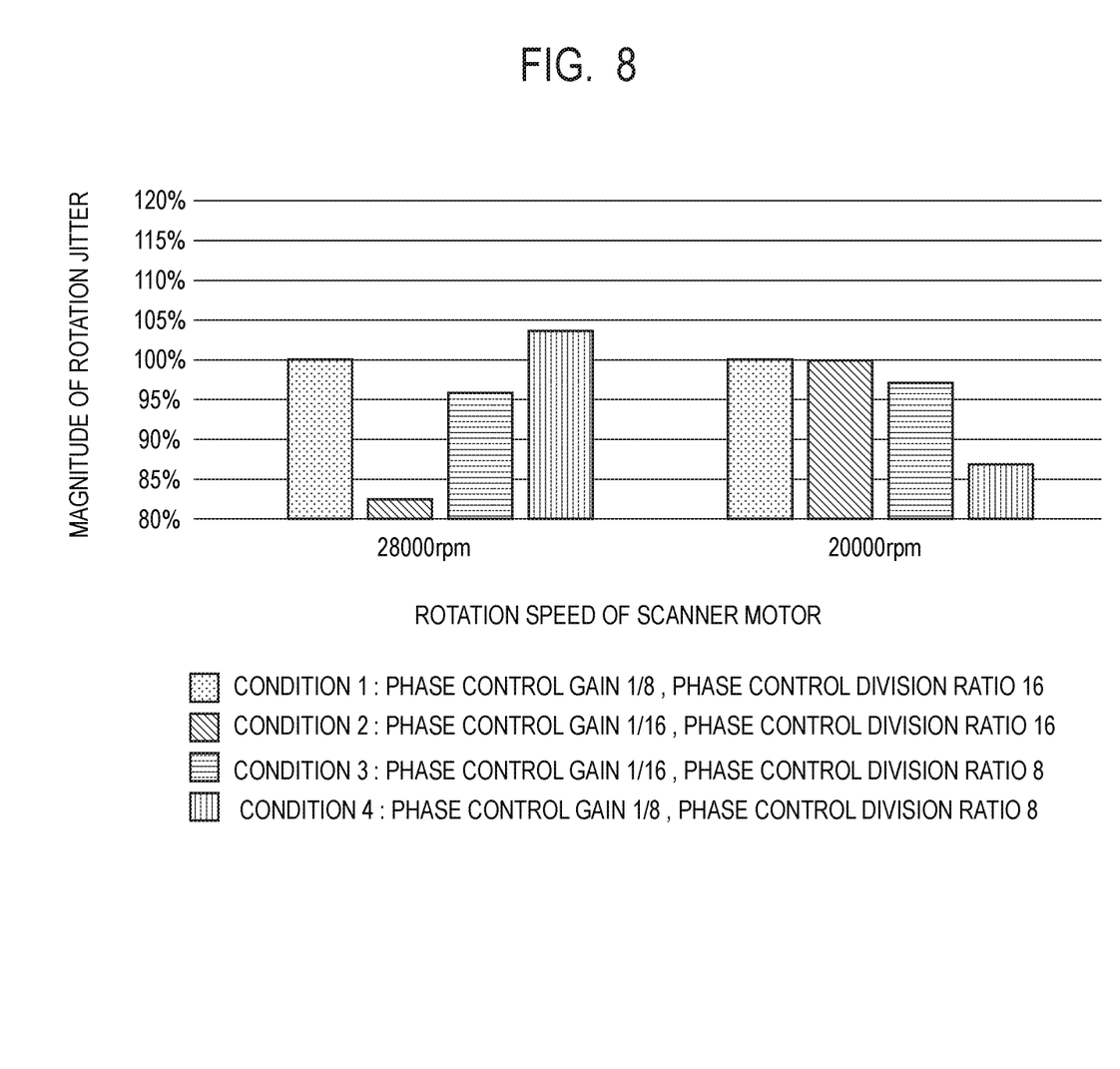
FIG. 8 is a graph for showing a relationship between the rotation speed and the amount of rotation jitter of the scanner motor in the embodiment.

FIG. 8 shows a relationship between the rotation jitter and the pair of the phase control gain and the phase control division ratio in the modification example illustrated in FIG. 7A. In FIG. 8, the horizontal axis represents the rotation speed (rpm) of the scanner motor 100, and the vertical axis represents the magnitude (amount) of the rotation jitter in percent (%). FIG. 8 also shows relationships under four conditions. Specifically, Condition 1 is that the phase control gain is set to ⅛ and the phase control division ratio is set to 16. Condition 2 is that the phase control gain is set to 1/16 and the phase control division ratio is set to 16. Condition 3 is that the phase control gain is set to 1/16 and the phase control division ratio is set to 8. Condition 4 is that the phase control gain is set to ⅛ and the phase control division ratio is set to 8. In FIG. 8, in the same manner as in FIG. 6, the magnitude of the rotation jitter is set to 100% under Condition 1, to thereby normalize the magnitude of the rotation jitter under each condition.

Under a state in which the scanner motor 100 is rotating at a high speed (28,000 rpm), the rotation jitter is smaller under Condition 2 than under the other conditions. Meanwhile, when the scanner motor 100 is rotating at a low speed (20,000 rpm), the rotation jitter is smaller under Condition 4 than under the other conditions. Therefore, even in the case of the modification example, it is preferred to set the phase control gain and the phase control division ratio for each steady rotation speed of the scanner motor 100 (namely, the image forming speed) so as to reduce the rotation jitter. Under the control in the embodiment, it is possible to reduce the rotation jitter by about 20% as compared to the related-art case in which the same phase control gain and the same phase control division ratio are used. In addition, by applying the control in the embodiment to the scanner motor 100 including the rotary polygon mirror 102A illustrated in FIG.

7A, it is possible to produce a greater effect than in a case of a rotary polygon mirror having equal interior angles. In the embodiment and the modification example, the rotary polygon mirror 102 having four reflection faces has been described, but the present disclosure may be applied to a rotary polygon mirror having another number of reflection faces, examples of which include five and six. Further, in the above-mentioned example, the phase control gain and the phase control division ratio are set based on the steady rotation speed, but any one of the phase control gain and the phase control division ratio may be set based on the steady rotation speed.

In this manner, even when the acceleration/deceleration signal for the steady rotation control is transmitted at the timing at which the total sum of the target BD periods becomes the same, the scanner motor in which the interior angles of the rotary polygon mirror are adjusted can be accurately controlled at all the steady rotation speeds to be used, Then, it is possible to achieve the image forming apparatus capable of optimizing the rotation jitter for each steady rotation speed to output a high-quality image.

As described above, according to the embodiment, the image quality can be improved by optimizing the rotation jitter for each steady rotation speed of the scanner motor.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-098112, filed May 24, 2019, which is hereby incorporated by reference herein in its entirety.

What is claimed is:

1. An image forming apparatus configured to form an image on a recording material at an image forming speed corresponding to a type of the recording material, the image forming apparatus comprising:
    a photosensitive member;
    a scanner unit configured to scan with light beam in accordance with image information, the scanner unit including:
        a deflection unit including:
            a rotary polygon mirror configured to deflect the light beam emitted from a light source; and
            a drive unit configured to rotate the rotary polygon mirror; and
        a beam detector configured to detect the light beam deflected by the deflection unit to output a first signal;
    a reference signal generating portion configured to output a second signal to be used as a reference when phase control is performed on the rotary polygon mirror; and
    a phase controller configured to perform the phase control of the drive unit based on the first signal and the second signal,
    wherein the image formed on the photosensitive member is transferred on the recording material,
    wherein the phase controller is configured to perform the phase control in accordance with a condition set based on a rotation speed of the drive unit corresponding to the image forming speed,
    wherein the phase controller is configured to perform the phase control by outputting a drive signal having a predetermined pulse width to the drive unit to accelerate or decelerate the drive unit so that the first signal and a position signal, based on the second signal, substantially match,
    wherein the condition is a pulse width of the drive signal and/or a frequency of performing the phase control, and
    wherein the slower the rotation speed, the smaller the pulse width and the smaller the frequency.

2. The image forming apparatus according to claim 1, wherein the phase controller is configured to generate the position signal, obtain a difference between a timing at which the first signal is received and a timing at which the position signal is generated, and obtain the pulse width of the drive signal based on the difference and the rotation speed of the drive unit corresponding to the image forming speed.

3. The image forming apparatus according to claim 2, wherein the position signal is a signal based on a time difference between the first signal and the second signal.

4. The image forming apparatus according to claim 2, wherein the phase controller is further configured to:
    control the drive unit to decelerate when the timing at which the first signal is received is earlier than the timing at which the position signal is generated; and
    control the drive unit to accelerate when the timing at which the position signal is generated is earlier than the timing at which the first signal is received.

5. The image forming apparatus according to claim 1, wherein the phase controller is configured to perform the phase control at the frequency being an integral multiple of a period at which the second signal is output.

6. The image forming apparatus according to claim 1, further comprising a steady rotation controller configured to cause the rotation speed of the drive unit to reach the rotation speed corresponding to the image forming speed,
    wherein the phase controller is configured to perform the phase control after the rotation speed of the drive unit reaches the rotation speed corresponding to the image forming speed by the steady rotation controller.

7. The image forming apparatus according to claim 1, wherein the rotary polygon mirror has a plurality of faces and is formed so that a plurality of interior angles each defined by two faces among the plurality of faces are different from one another.

8. An image forming apparatus configured to form an image on a recording material at a first image forming speed and a second image forming speed different from the first image forming speed, the image forming apparatus comprising:
    a first photosensitive member;
    a second photosensitive member;
    a first deflection unit configured to deflect a first light beam emitted from a first light source according to a first image information and configured to scan the first photosensitive member with the first light beam, the first deflection unit including a first rotary polygon mirror configured to reflect the first light beam and a first motor configured to rotate the first rotary polygon mirror;
    a second deflection unit configured to deflect a second light beam emitted from a second light source according to a second image information and configured to scan the second photosensitive member with the second light beam, the second deflection unit including a second rotary polygon mirror configured to reflect the second light beam and a second motor configured to rotate the second rotary polygon mirror;

a first beam detector configured to detect the first light beam deflected by the first deflection unit to output a first BD signal;

a second beam detector configured to detect the second light beam deflected by the second deflection unit to output a second BD signal;

a first phase controller configured to perform a rotation phase control of the first motor;

a second phase controller configured to perform a rotation phase control of the second motor; and a reference signal generating portion configured to output a reference phase signal to the first phase controller and the second phase controller, wherein a first image formed with the first light beam on the first photosensitive member and a second image formed with the second light beam on the second photosensitive member are transferred on the recording material, wherein the first phase controller outputs a first phase drive signal based on the reference phase signal and the first BD signal to the first motor;

wherein the second phase controller outputs a second phase drive signal based on the reference phase signal and the second BD signal to the second motor;

wherein the first motor and the second motor are controlled to have a first steady rotation speed when forming the image at the first image forming speed, and are controlled to have a second steady rotation speed when forming the image at the second image forming speed, and wherein at least one of a pulse width and a frequency of the first and second phase drive signals is different in a case where the first and second motors are controlled with the first steady rotation speed and in a case where the first and second motors are controlled with the second steady rotation speed.

9. The image forming apparatus according to claim 8, wherein the slower the first steady rotation speed, the smaller the pulse width and the smaller the frequency, and wherein the slower the second steady rotation speed, the smaller the pulse width and the smaller the frequency.

10. The image forming apparatus according to claim 8, wherein the first phase controller is configured to generate a position signal, obtain a difference between a timing at which the first BD signal is received and a timing at which the position signal is generated, and obtain the pulse width of the first phase drive signal based on the difference and the first or second steady rotation speed of the first motor corresponding to the first or second image forming speed, and wherein the second phase controller is configured to generate a position signal, obtain a difference between a timing at which the second BD signal is received and a timing at which the position signal is generated, and obtain the pulse width of the second phase drive signal based on the difference and the first or second steady rotation speed of the second motor corresponding to the first or second image forming speed.

11. The image forming apparatus according to claim 10, wherein the position signal of the first phase controller is a signal based on a time difference between the first BD signal and the reference phase signal, and wherein the position signal of the second phase controller is a signal based on a time difference between the second BD signal and the reference phase signal.

12. The image forming apparatus according to claim 8, wherein each of the first and second rotary polygon mirrors has a plurality of faces and is formed so that a plurality of interior angles each defined by two adjacent faces among the plurality of faces are different from one another.

* * * * *